Figure 1:
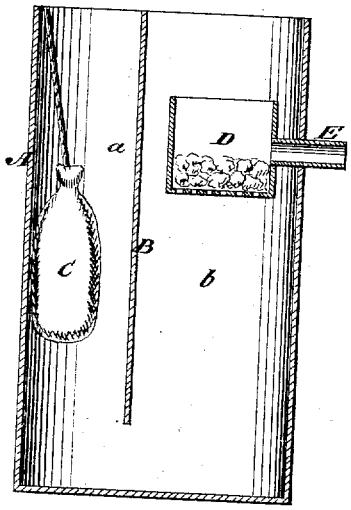

J. SHAW.

Improvement in Apparatus for Recovering Gold and Silver from Waste Solutions.

No. 4,969. Reissued July 9, 1872.

Witnesses:
C. Wolff
J. Felbel

Inventor
Lelyleman Shaw.
By attorney
J. A. McIntire.

UNITED STATES PATENT OFFICE.

JEHYLEMAN SHAW, OF BRIDGEPORT, CONNECTICUT.

IMPROVEMENT IN APPARATUS FOR RECOVERING GOLD AND SILVER FROM WASTE SOLUTIONS.

Specification forming part of Letters Patent No. 35,842, dated July 8, 1862; reissue No. 1,651, dated April 5, 1864; reissue No. 3,506, dated June 15, 1869; reissue No. 4,030, dated June 14, 1870; reissue No. 4,969, dated July 9, 1872.

DIVISION A.

*To all whom it may concern:*

Be it known that I, JEHYLEMAN SHAW, of Bridgeport, in the county of Fairfield and State of Connecticut, have invented certain new and useful improvements in apparatus adapted to carrying on a process for recovering the gold and silver from what are known as "photographic waste solutions;" and I do hereby declare the following to be a full, clear, and exact description thereof, reference being had to the accompanying drawing forming part of this application.

The apparatus made the subject of this application is particularly designed to carry on a certain process of extraction of the gold and silver from waste solution by precipitation, made the subject of another application by me, filed simultaneously with this, and the main feature of which consists in the use of sulphuret of potassium as a precipitant.

Previous to my invention and its introduction into use, it was customary to allow the waste solutions of photographic establishments to run off, with their contained precious metals, (the amount of which is very small in proportion to the quantity of water in which they are held in solution,) from the sinks or other vessels or receptacles over which the washing and other parts of the photographic process are generally conducted.

My invention relates to a novel apparatus, to be used either in connection with or in place of the usual sink or basin, and adapted to carry out a process of precipitation by which all the gold and silver will be accumulated, while the water and other valueless substances are permitted to freely flow off to waste or run out; and my invention consists in a vessel so constructed and provided with a receptacle for the "precipitant," that while it will permit the solutions which are to be treated to flow through it, the said solutions will be brought into contact with the precipitant as they enter or flow into the vessel, and the precipitated metals will be collected in the said vessel, as will be hereinafter more fully explained; and my invention further consists in the use, in combination with such a vessel, of a partition or partitions extending down nearly to the bottom of the vessel, and so arranged as to prevent the passage of the precipitated metals, as the solution flows through the apparatus, as will be hereinafter more fully described; and my invention further consists in the use, in combination with such partitioned vessel, of a filter or collector, arranged and operating as hereinafter more fully explained.

To enable those skilled in the art to make and use my invention I will proceed to more fully describe it, referring by letters to the accompanying drawing, in which—

Figure 2:
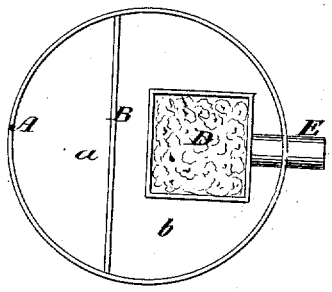

Figure 1 is a vertical section, and Fig. 2 a horizontal section, of my improved apparatus.

A represents a vessel, made of metal, china, glass, or other suitable material, and provided, as shown, with a partition, B, which extends from the top of vessel A down to within a short distance of its bottom, dividing the said vessel into two compartments, *a* and *b*, which communicate at or near the bottom of A. In the smaller of the two compartments *a* is arranged a bag, C, which contains the chemical ingredients employed as the "precipitant," while in the other larger compartment *b* is located a filter or collector, D, arranged near the top of the vessel, and provided with an exit-pipe, E, through which the solution is discharged from the apparatus. This filter may be made of any suitable materials, and in a variety of ways. I have represented it made in the form of a square box, and with a perforated or pervious bottom, over which is put a layer of sawdust; the latter being covered with cotton-batting, and the whole retained by a cloth stretched over the batting. The shape and construction of this filter may, however, be varied at the pleasure of the constructor or operator. Where the filter is adapted to permit the passage of the solution through its bottom, and thence to the exit-pipe E, the latter should be located near the top of the filter, and when it is designed to have the solution enter at the top of the filter the bottom should be closed or impervious, and the discharge-pipe E should be arranged beneath the stratums of filtering materials. In lieu of the sawdust and cotton alluded to, the process of straining or filtration (to arrest any small particles of metal which flow upward toward the exit) may be conducted in a filter formed of other material.

I have shown the vessel A as of about a cylindrical or barrel-like shape, but its form may, of course, be changed at pleasure.

In the use of my improved apparatus the vessel A is to be placed so as to receive into its compartment *a* the solutions or washings from the sink, or from wherever the washing and wasting occur. As the waste solutions enter into *a* they are brought into continuous contact with the precipitant contained in the bag C, and a chemical action is induced by which all the metal held in solution is precipitated, and, settling at the bottom of the vessel A, is periodically collected or removed therefrom. The solution which runs in at the top of compartment *a* fills both compartments (*a* and *b*) to the same level, of course, and finds an escape gradually and continually through the filter D and exit-pipe E; but since that portion of the body of the liquid from which the escape occurs (near the top of the vessel) is separated from the other portion by the partition B, except at a small place near the bottom of the reservoir, any tendency of the particles, which are being precipitated by the action of the chemical contents of the bag C, to float off is prevented, and any direct current from the place where the precipitation is effected to where the solution is discharged is avoided. As the discharge of the waste solution into the vessel will generally be intermittent, or at intervals, the current of flow through the apparatus may be retarded and made very slow by making the filter so that it will not allow the solution to run through it as fast as it enters the apparatus. The particles of precipitation are induced to settle down in the compartment *a* and form a deposit on the bottom of the vessel, and any particles which may float up (and which might otherwise escape) are arrested by the filter D. In lieu of arranging the apparatus to catch the waste from the sink or basin of the photographer, it may be so formed as to be adapted for use in the place of the sink or other vessel generally used, and so that the washings can be conveniently done over the compartment *a*. It is important, however, to have the bag C, or other receptacle for containing the precipitant, located near the upper portion of compartment *a*, or so that the fresh solutions entering will come continually in contact with the precipitant, and so that the latter will not at any time have its efficiency impaired by the collection about it of any deposit or sediment. In lieu of the bag shown any other suitable device for the retention of the precipitant may, of course, be employed.

Having so fully explained the construction and operation of my improved apparatus for the recovery of gold and silver from waste solutions that any one skilled can make and use it, what I claim therein as new, and desire to secure by Letters Patent, is—

1. A suitable vessel, substantially such as described, adapted to receive the waste solutions and prevent their escape therefrom above the bottom, and provided with a means for holding the precipitant where the solution will come into contact with it as they enter the vessel, substantially as hereinbefore described.

2. In combination with a vessel or receptacle provided with a means for retaining the precipitant, and adapted to permit the passage into and from it of the solutions to be treated, of a partition or its equivalent for the purpose of arresting those particles precipitated which might otherwise escape, and inducing them to settle down in lieu of following the current of discharge, as hereinbefore set forth.

3. In combination with a suitable vessel provided with a means for holding the precipitant, and the means for inducing the settlement of the precipitated metal, a filter arranged to operate substantially as and for the purpose hereinbefore described.

In testimony whereof I have hereunto set my hand and seal this 1st day of June, 1872.

JEHYLEMAN SHAW. [L. S.]

In presence of—
J. N. McINTIRE,
JACOB FELBEL.